Figure 1:
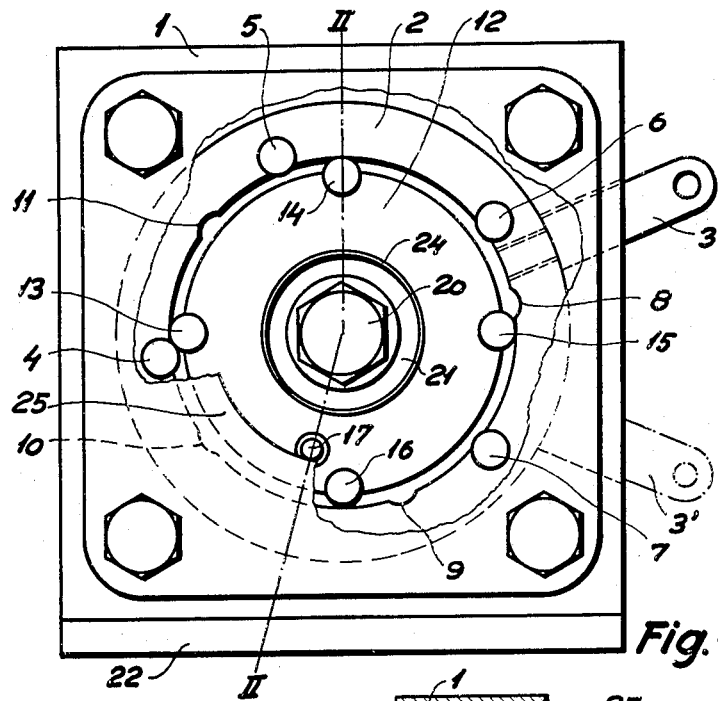

July 19, 1966     H. JESPERSEN     3,261,248

TUBE AND PIPE SHEARING APPARATUS

Filed Sept. 22, 1965

INVENTOR.
HENRIK JESPERSEN

BY

*Dayton R. Stemple, Jr.*

ATTORNEY 3,261,248
TUBE AND PIPE SHEARING APPARATUS
Henrik Jespersen, Gadestaevnet 1, Copenhagen
Hvidovre, Denmark
Filed Sept. 22, 1965, Ser. No. 489,256
Claims priority, application Denmark, Sept. 26, 1964,
4,747/64
4 Claims. (Cl. 83—186)

This invention relates to a tube and pipe shearing apparatus.

The cutting of tubes and pipes is generally performed as a paring operation, either by cutting off while the tube or pipe is rotating in a lathe or by cutting with a side-milling cutter or a diamond wheel. Tubes may also be sheared by means of a tube shearer (particularly for hand shearing) in which a sharp steel wheel is forced deeper and deeper into the tube wall, while simultaneously the wheel is rotated repeatedly about the tube.

It is further known to use a tube shearing apparatus in which internal and external closely mounted knives are displaced radially relative to each other by means of more or less complicated mechanisms.

It is an object of the invention to provide a simplifying of the mechanism required for displacement of the displaceable knife and to enable the displaceable knife to be displaced successively in several directions relatively to the fixed knife.

According to the invention this has been achieved by a tube and pipe shearing apparatus comprising a fixed and a displaceable circular knife, said knives being coaxially positioned and closely contacting each other, both knives being adapted to tightly enclose a tube or pipe to be sheared, the displaceable knife being so mounted relatively to the fixed knife that it can be displaced relatively thereto along the contacting surfaces of the knives and wherein the displaceable knife is mounted in a guide ring by means of four primary cams projecting from the displaceable knife into a circular space between the guide ring and the displaceble knife, the primary cams being interspaced by an angular distance of 90°, said primary cams cooperating with at least two secondary cams disposed on the guide ring and projecting into said space, the secondary cams being interspaced by an angular distance less than 90°, the guide ring being further provided with notches in the interior cylindrical surface thereof, said notches being positioned diametrically in relation to said secondary cams, the guide ring being adapted to be turned coaxially with the fixed knife.

The advantages of this construction are that the knives are activated in a particularly simple and reliable manner, and that the entire operation may be completed by a short angular turning of the guide ring. In accordance with a preferred embodiment of the invention the said cams may be rotatably mounted rollers, preferably steel rollers.

Figure 2:
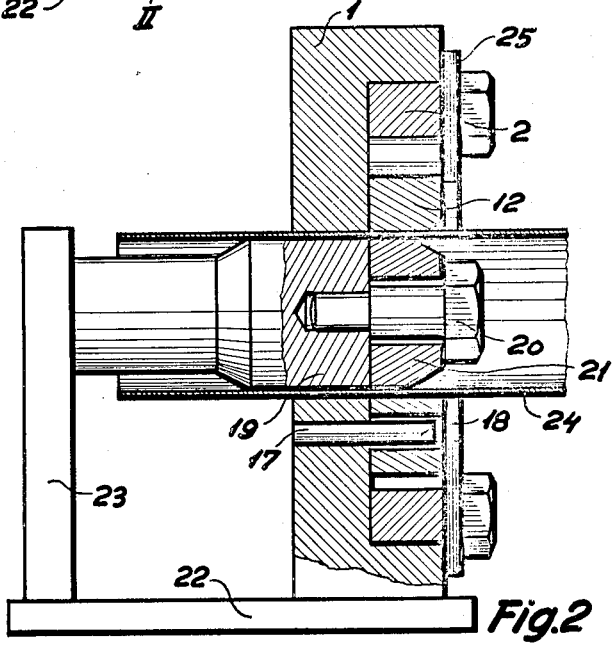

Further details of the invention shall be explained in relation to an embodiment of a tube and pipe shearing apparatus illustrated in the drawing, in which:

FIG. 1 shows a tube shearing apparatus viewed in front elevation in the axial direction of the tube profile, FIG. 2 shows a vertical section along the line II—II in FIG. 1.

The shown embodiment of the tube and pipe shearing apparatus comprises a frame 1 supported on a base plate 22 and forming a fixed knife enclosing a tube 24. The tube, moreover, is supported by a plug 19 carried by a bracket 23 secured to the base plate 22. The plug 19 forms an internal knife.

In the frame 1 is rotatably mounted a guide ring 2, in which in turn is mounted a displaceable knife 12 which tightly contacts the frame 1 so that their common contact faces are flush with the end of the plug 19. The knife 12 is guided by means of a pin 17 which is secured in the frame 1 and projects with a certain clearance into a hole 18 in the knife 12. In order to keep the displaceable knife 12 in contact with the fixed knife 1, a ring 25 overlapping the knife 12 is secured to said fixed knife or frame 1, thus also keeping the guide ring 2 in position.

At the end of the plug 19 there is a further knife 21, disposed within the tube 24 and retained in contact with the plug 19 by means of a screw 20 with a clearance permitting the knife 21 to be radially displaced relatively to the plug 19 while being retained in contact with the end face of the plug, so that the common contact face of the knife 21 and the plug 19 are flush with the contact face between the frame 1 and the knife 12.

The frame 1 and the knife 12 thus form the two external knives, and to achieve the shearing of the tube 24 the knife 12 is guided by means of the guide ring 2, the knife 12 being provided with four primary cams 13, 14, 15 and 16, which in the present embodiment are formed as rotatably mounted rollers, preferably steel rollers. These four cams are spaced from each other by an angular distance of 90° and cooperate with four secondary cams 4, 5, 6 and 7 inside the guide ring 2 and being spaced from each other by an angular distance slightly less than 90°, i.e., between two of these cams, namely 4 and 7, the angular distance will be substantially larger than 90°.

The guide ring 2 is provided with a projecting arm 3, by means of which the guide ring can be rotated within a certain angle by turning the arm 3 to position 3′, and it will be seen from the drawing that the four secondary cams 4, 5, 6 and 7 on the guide ring will successively cooperate with the four primary cams 13, 14, 15 and 16 on the knife 12, thus urging the knife 12 some distance away from the position coaxial with the plug 19, there being in the ring diametrically opposite each of the secondary cams 4, 5, 6 and 7 corresponding notches 8, 9, 10 and 11 for receiving the primary cams 15, 16, 13 and 14, respectively, during the said lateral displacement, which will take place successively in four different directions.

It will be evident that the distribution of the cutting operation among four cams may be varied at discretion and that the operation may very well be performed by two or three cams alone. The size of the cams, i.e., their angular extension, will affect the total angle of rotation necessary for achieving a complete shearing of the tube 24. It will appear from the drawing, however, that a complete cutting can be achieved by a rather short turning, and it will therefore be possible to activate the arm 3 simply by a vertical pressure. The internal movable knife 2 and the plug 19 provide particularly effective support for the tube 24, but with tubes of substantial wall thickness such knives may be dispensed with.

What is claimed is:

1. A tube and pipe shearing apparatus comprising a fixed and a displaceable circular knife, said knives being coaxially positioned and closely contacting each other, both knives being adapted to tightly enclose a tube or pipe to be sheared, the displaceable knife being so mounted relatively to the fixed knife that it can be displaced relatively thereto along the contacting surfaces of the knives and wherein the displaceable knife is mounted in a guide ring by means of four primary cams projecting from the displaceable knife into a circular space between the guide ring and the displaceable knife, the primary cams being interspaced by an angular distance of 90°, said primary cams cooperating with at least two secondary cams disposed on the guide ring and projecting into said space, the secondary cams being interspaced by an angular distance less than 90°, the guide ring being further provided with notches in the interior cylindrical surface thereof, said notches being positioned diametrically in relation to said secondary cams, the guide ring being adapted to be turned coaxially with the fixed knife.

2. A tube and pipe shearing apparatus as claimed in claim 1 and wherein the said primary and secondary cams consist of rotatably mounted rollers, preferably steel rollers.

3. A tube and pipe shearing apparatus as claimed in claim 1 and wherein a supporting plug serving as an internal knife is rigidly secured to a base plate which also is rigidly connected to the fixed circular knife, the end surface of the internal knife being in flush with said contacting surfaces of the fixed and the displaceable knives.

4. A tube and pipe shearing apparatus as claimed in claim 1 and wherein a supporting plug serving as an internal knife is rigidly secured to a base plate which also is rigidly connected to the fixed circular knife, the end surface of the internal knife being in flush with said contacting surfaces of the fixed and the displaceable knives, a further internal, displaceable knife being attached to the end surface of said plug in such a manner that it is radially but not axially displaceable in relation to said plug, said internal, displaceable knife being of a diameter fitting substantially tightly in the interior of the tube or pipe to be sheared.

No references cited.

WILLIAM W. DYER, Jr., *Primary Examiner.*

L. B. TAYLOR, *Assistant Examiner.*